UNITED STATES PATENT OFFICE.

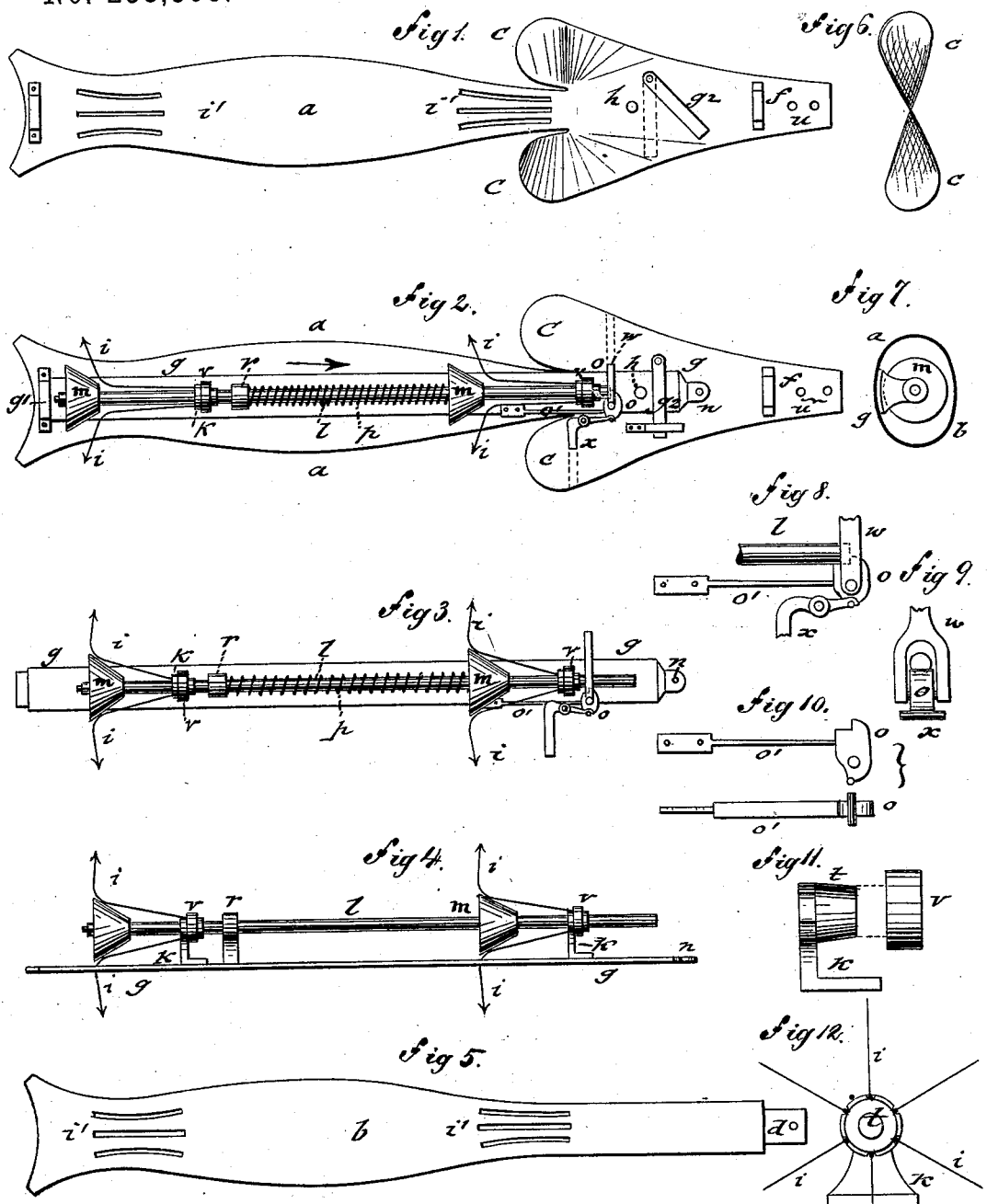

KARL MÜLLER, OF HORNBERG, BADEN, GERMANY.

BAIT-HOOK.

SPECIFICATION forming part of Letters Patent No. 253,308, dated February 7, 1882.

Application filed September 19, 1881. (No model.)

*To all whom it may concern:*

Be it known that I, KARL MÜLLER, residing at Hornberg, Baden, German Empire, have invented a new and Improved Bait-Hook, of which the following is a specification.

This invention has reference to an improved bait-hook, in which the hooks are mechanically released when the fish tampers therewith, the device being specially designed for artificial-bait fishing.

The invention consists of a casing of sheet metal or other material, which is preferably made in the shape of a fish. The casing contains several sets of hooks, which are withdrawn into the casing, but thrown out of the same as soon as the fish bites. The hooks are retained within the casing by a suitable mechanism until released by the biting of the fish. Rotary motion is imparted by spirally-bent wings.

The specific construction of the different mechanisms will be described hereinafter, and finally be pointed out in the claims.

In the accompanying drawings, Figure 1 represents an inside view of one section of the shell of my improved bait-hook. Fig. 2 is an inside view of the same with the hook-operating mechanism. Figs. 3 and 4 are detail top and side views of the hook-operating mechanism as detached from the shell. Fig. 5 is a side view of the other section of the shell or casing; and Figs. 6, 7, 8, 9, 10, 11, and 12 are detail views of the different operating parts.

Similar letters of reference indicate corresponding parts.

The bait-hook is inclosed within a casing or shell which is made of two sections, $a$ and $b$. (Shown respectively in Figs. 1, 5, and 7.) These sections form together a casing of elliptical cross-section, as shown in Fig. 7. The casing or shell is made in the general shape of a fish, the section $a$ being provided at that part which represents the head of the fish with helically-bent wings $c$, as shown in Figs. 1, 2, and 6, while the shell-section $b$ is provided at the corresponding end with a lug, $d$, which fits into an eye, $f$, of the head of the section $a$. The edges of the shell $a$ and $b$ are so fitted that they can be readily sprung together by light pressure, the spring-pressure of one section retaining the other in position. In place of this connection any other suitable mode of connecting the shell-sections may be used. At the interior of the casing $a\, b$ is arranged a mechanism for throwing forward the catching-hooks. This mechanism is applied to a base-plate, $g$, and is shown in detail in Figs. 2, 3, and 4. The base-plate $g$ is retained at its rear end on the section $a$ by means of a retaining-strip, $g'$, at the tail of the same, while the front end is secured by a pin, $h$, and by a latch-piece, $g^2$, so that the plate $g$ is thereby firmly retained in position.

To the plate $g$ are further attached two guide-brackets, $k$, which are shown in detail in Figs. 11 and 12, by which the rod $l$ is guided. This rod is provided with two fixed cones, $m$, one near the rear end of the rod $l$, the other near the front end of the same, back of the head of the shell.

Between the front cone $m$ and a collar, $r$, attached to base-plate $g$, is interposed a spiral spring, $p$, which bears upon the front cone $m$, and which tends to throw the rod $l$ in the direction of the arrow shown in Fig. 2. The spring-pressed rod $l$ is locked by a recessed latch-piece, $o$, that is retained at the front end of the rod $l$ by a spring, $o'$, and by a forked rod, $w$, and a fulcrumed lever, $x$, as shown in Fig. 2, and in details in Figs. 8, 9, and 10.

The latch-piece $o$ may be moved so as to clear the rod $l$, as shown in Fig. 3, by pressure upon the rod $w$ and lever $x$, which are extended beyond the shell at opposite sides of the head. When the pressure on the rod $w$ and lever $x$ is released and rod $l$ withdrawn the latch $o$ retains again the rod $l$. The guide-brackets $k$ serve also for the purpose of applying thereto a number of hooks, $i$, which extend radially from the grooved cone $t$ of each bracket, the ball-shaped inner ends of the hooks being retained in the grooves of the cones $t$ by collars $v$, as shown in Fig. 11.

The shell or casing is provided with slits $i'$, for the free outward passage of the hooks when the actuating mechanism is released. The hooks $i$ are bent as shown in details in Figs. 2, 3, and 4, and are thrown in outward direction by the cones $m$ as soon as the latch $o$ is released from the rod $l$ and permits the forward motion of the same.

The bait-hook is operated in the following manner: A silver string is attached by means of the hole $n$ to the front end of the base-plate $g$, and then passed through the two holes $u$ at the head of the section $a$, being then connected with a common string, by which the bait is drawn through the water. The shell is plated with silver or nickel, so that as it is rotated by the wings $c$ a glittering effect is produced. The fish is attracted by the glittering of the bait and follows the same. It is a well-known fact that the fish tries always to bite at the head. This causes the pushing in of the parts $w$ $x$ by the force of the bite, and consequently the release of the latch $o$ and of the rod $l$, which is instantly thrown forward, so that the cones $m$ spread the hooks $i$, which pass through the outside of the shell into the mouth of the fish and hold it in such a manner that a release of the same is impossible.

According to the species and the size of fish to be caught, the apparatus may be made stronger or lighter or provided with more or less hooks. If desired, the operating mechanism may be inserted into the body of a dead but dressed fish, in which case the spirally-bent wings are attached by an elongated shank to a socket of the base-plate $g$.

Having thus described my invention, I claim as new and desire to secure by Letters Patent—

1. In a bait-hook, the combination of a fish-shaped shell, having helically-bent fins back of the head and longitudinal slits in the body thereof, with outwardly-swinging hooks, a spring-actuated mechanism for throwing out the hooks, and a latch mechanism projecting through the head of the shell, whereby the hook-actuating mechanism is locked or released, substantially as set forth.

2. In a bait-hook, the combination of the longitudinally-guided rod $l$, having fixed cones $m$ and spring $p$, with the outwardly-swinging hooks $i$, hinged to the brackets $k$, substantially as set forth.

3. In a bait-hook, the combination of the outwardly-swinging hooks $i$ and guided slide-rod $l$ with a recessed locking-latch, $o$, spring $o'$, forked rod $w$, and fulcrumed lever $x$, substantially as specified.

4. In a bait-hook, the combination of the guide-brackets $k$, having each a grooved cone, $t$, with hooks $i$, retaining-collars $v$, shell $a$ $b$, having slits $i'$ for the hooks $i$, and means for operating the hooks, substantially as set forth.

In testimony whereof I have signed my name to this specification in the presence of two subscribing witnesses.

KARL MÜLLER.

Witnesses:
 HIMMEL POLTZERPRYNUCH,
 GOTTLIEB HEINZMANN.